US010880192B1

United States Patent
Borovikov et al.

(10) Patent No.: US 10,880,192 B1
(45) Date of Patent: *Dec. 29, 2020

(54) INTERACTIVE AGENTS FOR USER ENGAGEMENT IN AN INTERACTIVE ENVIRONMENT

(71) Applicant: Electronic Arts Inc., Redwood City, CA (US)

(72) Inventors: Igor Borovikov, Foster City, CA (US); Mohsen Sardari, Redwood City, CA (US); John Kolen, Half Moon Bay, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,996

(22) Filed: Jul. 2, 2019

Related U.S. Application Data

(63) Continuation of application No. 15/474,970, filed on Mar. 30, 2017, now Pat. No. 10,389,607.

(51) Int. Cl.
  *H04L 12/26* (2006.01)
  *H04L 29/08* (2006.01)

(52) U.S. Cl.
  CPC .............. *H04L 43/08* (2013.01); *H04L 43/06* (2013.01); *H04L 43/16* (2013.01); *H04L 67/14* (2013.01)

(58) Field of Classification Search
  None
  See application file for complete search history.

(56) References Cited

U.S. PATENT DOCUMENTS

| | | | |
|---|---|---|---|
| 6,758,754 B1 * | 7/2004 | Lavanchy | A63F 13/12 463/42 |
| 2005/0101386 A1 | 5/2005 | Lavanchy et al. | |
| 2015/0360129 A1 * | 12/2015 | Cudak | A63F 13/358 463/42 |
| 2017/0304707 A1 * | 10/2017 | Morton | G09B 7/00 |
| 2019/0030432 A1 * | 1/2019 | Catlin | A63F 13/40 |

\* cited by examiner

*Primary Examiner* — Scott B Christensen
(74) *Attorney, Agent, or Firm* — McDermott Will & Emery LLP

(57) ABSTRACT

Various aspects of the subject technology relate to systems, methods, and machine-readable media for interactive computer-operated agents for user engagement in an interactive environment. Computer-operated agents are introduced to help populate a session and are configured to maximize engagement rates among users associated with user-controlled agents. During these interactions, engagement metrics are collected that indicate different interaction rates at different times by the computer-operated agents. The number of popular computer-operated agents (with relatively high interaction rates) can be kept in circulation while some less popular computer-operated agents (with relatively smaller interaction rates) can be kept in circulation for diversity or are purged from circulation. In the disclosed system, for each instance that a user-controlled agent interacts with a computer-operated agent, a log of behavior data from that interaction can be monitored and collected to generate and/or adjust behavior models that provide the behavioral response distribution for a given computer-operated agent.

20 Claims, 10 Drawing Sheets

INTERACTIVE AGENTS FOR USER ENGAGEMENT IN AN INTERACTIVE ENVIRONMENT

CROSS-REFERENCE TO RELATED APPLICATION

The present application claims the benefit of priority under 35 U.S.C. § 120 as a continuation of U.S. patent application Ser. No. 15/474,970, entitled "INTERACTIVE AGENTS FOR USER ENGAGEMENT IN AN INTERACTIVE ENVIRONMENT," filed on Mar. 30, 2017, the disclosure of which is hereby incorporated by reference in its entirety for all purposes.

TECHNICAL FIELD

The present disclosure generally relates to a computer-operated multiuser interactive environment, and more particularly to interactive agents for user engagement in an interactive environment.

BACKGROUND

Video games, such as sports-themed and life simulation video games, provide ever increasing realistic game-playing experiences, including interactive environments where players can interact with one another during gameplay. Although a player can host a meetup with other players or can join an existing ensemble of players, the number of players participating from the start of a game and throughout the game can be inconsistent.

SUMMARY

The disclosed system provides for the populating of multiuser sessions of an interactive environment, where a number of computer-operated agents are introduced into a multiuser session at a start of the session (or during a time when attendance in the session was measured below target levels) to provide the appearance that the session is populated with participants above target attendance levels and to maximize user engagement within the session. In the disclosed system, the population of computer-operated agents that can join a session is not fixed, and is adaptable based on the number of user-controlled agents (or user attendance level) and the target population for the session. The distribution of behavior by the computer-operated agents changes as the interactions within the session progress. The computer-operated agents interact with user-controlled agents during gameplay based on the response signals from the user-controlled characters. In the disclosed system, information about the interactions with the computer-operated agents can be collected from metadata of the user-controlled agents and/or interaction data from the session. For example, the collected information can indicate that a particular user has a willingness to interact with a specific computer-operated agent, and the user may have a history of not interacting with other computer-operated agents. In this respect, the collected information that is gathered can provide useful indicators where certain computer-operated agents are not increasing the interaction rates among users and, therefore, these certain computer-operated agents can be removed from circulation such that the population of computer-operated agents can be updated accordingly.

According to one embodiment of the present disclosure, a computer-implemented method is provided. The method includes determining a number of participant devices connected to a multiuser session of an interactive environment, in which the multiuser session includes a user-controlled agent associated with a participant device that initiated the multiuser session for interaction with other user-controlled agents that join the multiuser session. The method also includes determining that the number of participant devices does not exceed a threshold session population for the multiuser session. The method also includes providing a set of computer-operated agents associated with the interactive environment to the multiuser session based on the number of participant devices not exceeding the threshold session population, in which at least one computer-operated agent in the set of computer-operated agents is configured to interact with the user-controlled agent in the multiuser session.

According to one embodiment of the present disclosure, a system is provided including a processor and a memory comprising instructions stored thereon, which when executed by the processor, cause the processor to perform a method. The method includes determining a number of participant devices connected to a multiuser session of an interactive environment, in which the multiuser session includes a user-controlled agent associated with a participant device that initiated the multiuser session for interaction with other user-controlled agents that join the multiuser session. The method also includes determining that the number of participant devices does not exceed a threshold session population for the multiuser session. The method also includes providing a set of computer-operated agents associated with the interactive environment to the multiuser session based on the number of participant devices not exceeding the threshold session population, in which at least one computer-operated agent in the set of computer-operated agents is configured to interact with the user-controlled agent in the multiuser session.

According to one embodiment of the present disclosure, a non-transitory computer readable storage medium including instructions that, when executed by a processor, cause the processor to perform a method. The method includes determining a number of participant devices connected to a multiuser session of an interactive environment, in which the multiuser session includes a user-controlled agent associated with a participant device that initiated the multiuser session for interaction with other user-controlled agents that join the multiuser session. The method also includes determining that the number of participant devices does not exceed a threshold session population for the multiuser session. The method also includes providing a set of computer-operated agents associated with the interactive environment to the multiuser session based on the number of participant devices not exceeding the threshold session population, in which at least one computer-operated agent in the set of computer-operated agents is configured to interact with the user-controlled agent in the multiuser session.

According to one embodiment of the present disclosure, a system is provided that includes means for storing instructions, and means for executing the stored instructions that, when executed by the means, cause the means to perform a method. The method includes determining a number of participant devices connected to a multiuser session of an interactive environment, in which the multiuser session includes a user-controlled agent associated with a participant device that initiated the multiuser session for interaction with other user-controlled agents that join the multiuser session. The method also includes determining that the number of participant devices does not exceed a threshold session population for the multiuser session. The method also includes providing a set of computer-operated agents associated with the interactive environment to the multiuser session based on the number of participant devices not exceeding the threshold session population, in which at least one computer-operated agent in the set of computer-operated agents is configured to interact with the user-controlled agent in the multiuser session.

According to one embodiment of the present disclosure, a computer-implemented method is provided. The method includes determining whether a multiuser session of an interactive environment includes a number of participant devices that exceeds a threshold session population for the multiuser session, in which the multiuser session includes a user-controlled agent associated with a participant device that initiated the multiuser session for interaction with other user-controlled agents that join the multiuser session. The method also includes adding a set of computer-operated agents associated with the interactive environment to the multiuser session when it is determined that the multiuser session does not include a number of participant devices that exceeds the threshold session population.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
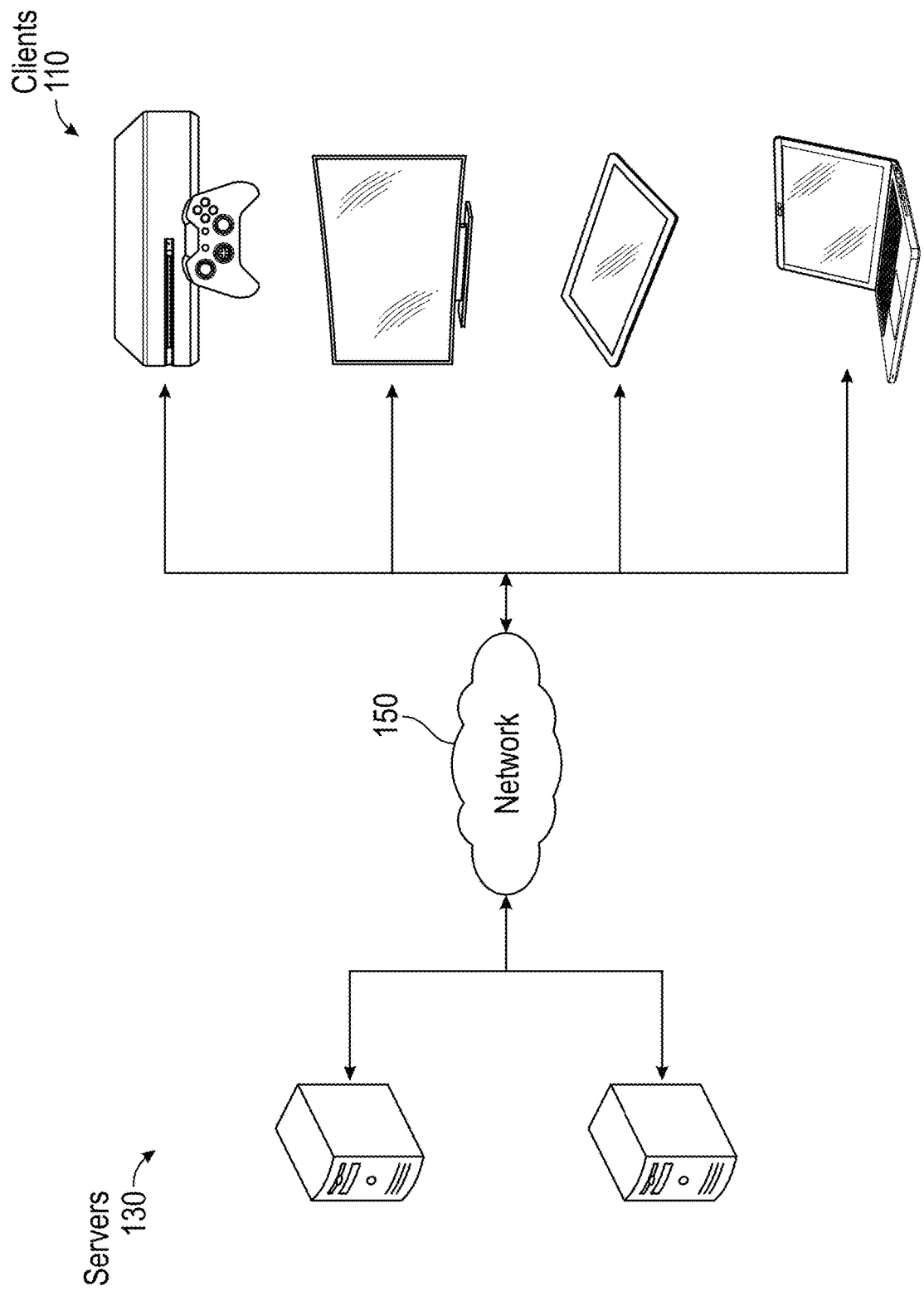
FIG. 1 illustrates an example architecture for interactive computer-operated agents for user engagement in an interactive environment suitable for practicing some implementations of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The term "interactive environment" may be used, for example, in reference to a video game or a simulated virtual game, and the term "game" may be interchangeably used with the term "interactive environment." The term "multiuser session" may be used, for example, in reference to a party, a meeting, a gathering, a team, or the like. As used herein, the term "user-controlled agents" may be used, for example, in reference to virtual players or video game players.

General Overview

Traditional life simulation video games provide a player with gameplay that is freed from the traditional structure and direction typically found in video games, and the player is instead given the ability to choose what, when, and how the player chooses to approach the available choices in content. The video game may have no rules present and gameplay is derived from open-ended choice. Life simulation video games typically take place in an open-world setting as to facilitate the freedom of choice a player is given. The player can create virtual people with varying moods and places them in virtual households. In the multiuser life simulation interactive environments, a player may create a game that involves a party concept, where the player can host a party (or meetup) with other users or may attend a party hosted by another user. A challenge with the party concept is that if there are an insufficient number of players at the start of the game, the generated party would not be of interest to the player or the other players and, therefore, cause players not to attend the party or remain in attendance, and thereby cause the party to remain relatively low in attendance.

Social-based interactive environment sessions involve many user-controlled agents joining (or connecting to) a multiuser session for interactions with each other during gameplay. If there are not many user-controlled agents that have joined the session (e.g., the number of user-controlled agents does not exceed a target population threshold), then the state of gameplay may be that a subset of joined user-controlled agents exit the session (or terminated their connection to the session), thereby decreasing the user engagement rates with the interactive environment.

The disclosed system addresses a problem in traditional multi-player (or multiuser) game systems tied to computer technology and arising in the realm of computer networks, namely the technical problem of providing a consistent number of agent instantiations that maximize user engagement rates during gameplay sessions. The disclosed system solves this technical problem by providing a solution also rooted in computer technology, namely, by instantiating interactive computer-operated to an active multiuser session of the interactive environment to maximize the engagement rate by game participants (e.g., human users). In this respect, the computer-operated agents coexist with user-controlled agents to increase attendance and the amount of interaction among the attendees of the multiuser session. By having the computer-operated agent introduced into the multiuser session, information about the amount of interaction with the computer-operated agent can be measured as an indication of how much interaction the users (via the user-controlled agents) are having with the interactive environment. In the disclosed system, multiple items of information about the behavioral response by the user-controlled agents with the computer-operated agents is determined including, but not limited to, information about which particular computer-operated agent to introduce into the multiuser session, information about the number of computer-operated agents to introduce into a particular contextual setting of the multiuser session, and information about which computer-operated agents to remove from circulation based on the interaction rates (or other engagement metrics) associated with the computer-operated agents.

The disclosed system further provides improvements to the functioning of the computer itself because it saves data storage space, reduces system loading times and reduces the cost of system resources. Specifically, the purge of computer-operated agents facilitates the savings in storage space by not requiring to keep in storage less engaging agents because the more engaging agents are kept in circulation for different cycles of gameplay. The generation of computer-operated agents facilitates the reduction in the cost of system resources by accessing a common repository of interactive agent log that indicates which computer-operated agents are to be kept in the pool of available agents and which computer-operated agents are to be purged from the pool.

Example System Architecture

FIG. 1 illustrates an example architecture 100 for interactive computer-operated agents for user engagement in an interactive environment suitable for practicing some implementations of the disclosure. The architecture 100 includes one or more servers 130 and clients 110 connected over a network 150.

One of the many servers 130 is configured to host virtual-world data, such as virtual-world data corresponding to a life simulation. For purposes of load balancing, multiple servers 130 can host the real-world data. The server 130 may further be configured to host simulations for multiple clients 110. For example, the server 130 may host a multiplayer simulation for multiple clients 110 to connect to, such that the multiple clients 110 experience the same simulation at approximately the same time.

The clients 110 include one or more computing devices. The clients 110 may include devices capable of running a simulation engine, such as a sports game, for simulating sporting events. For example, the clients 110 may include stationary video game consoles, tablets, mobile devices, laptop computers, desktop computers, and/or other devices capable of running a sports game.

The disclosed system uses virtual-world data from one or more virtual events to drive a life simulation where users have dominion over the content. The server 130 sends the virtual-world data to one or more clients 110, which uses the virtual-world data in generating and running the simulation. As such, the disclosed system can, for example, create a fairly accurate simulation of real-life events without requiring a complete digitizing of the real-life event, or an extensive reconfiguration of a simulation engine.

The servers 130 can be any device having an appropriate processor, memory, and communications capability for hosting real-world data. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Interactive Computer-Operated Agents

Figure 2:
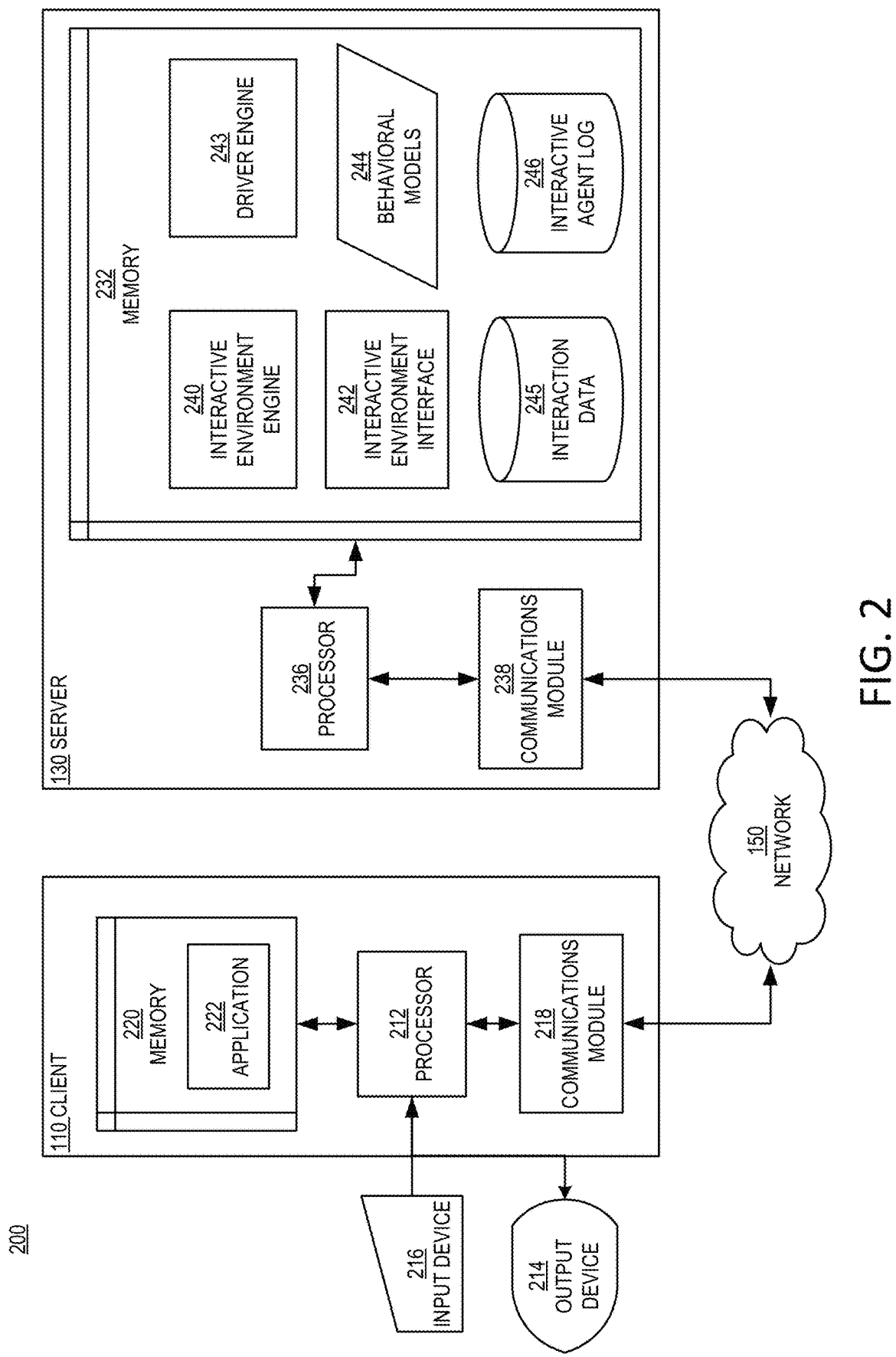
FIG. 2 is a block diagram illustrating the example device and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes an interactive environment engine 240, an interactive environment interface 242, and a driver engine 243. The processor 236 of the server 130 is configured to execute instructions, such as instructions physically coded into the processor 236, instructions received from software in the memory 232, or a combination of both.

The memory 232 also includes behavioral models 244. In one or more implementations, the behavioral models 244 represent respective configurations that utilize input parameters, and translate them to a corresponding behavioral sequence by a computer-operated agent. In this respect, the configurations can yield different behaviors given a set of attributes for the input parameters. In some aspects, the behavioral models 244 can output behavioral sequences based on random selection parameters or random quality metrics.

In one or more implementations, each of the behavioral models 244 includes a random distribution of behavioral response actions for the computer-operated agent. In one or more aspects, the distribution indicates what action should be selected for a given context that is argumentative. For example, if a user via the user-controlled agent has interacted with another character that is a computer-operated agent by submitting a message to the computer-operated agent that includes an interaction (e.g., a joke) intended for that character, the processor 236, using the driver engine 243, initiates a decision-making sub-flow to select an action from the distribution that either causes the computer-operated agent to either respond with a similar type of interaction (e.g., a new joke or simulated laughter in response to original joke) or to terminate the interaction with the user-controlled agent.

In one or more implementations, a behavioral model 244 includes a behavior tree that drives selections of actions. In one or more aspects, each of the selections is encoded into the behavior tree. The behavior tree may be a binary decision tree, where a parent node represents a trigger event and each child node represents a respective outcome from the trigger event. The behavioral model 244 may be an output from an artificial neural network, in which the behavioral model 244 represents a machine-learning model that can accept a current context as input and generate a new outcome selection based on the received current context input. In this respect, the selections made in the interactive environment are primarily discrete.

Also included in the memory 232 of the server 130 is interaction data 245. In certain aspects, the processor 236 is configured to determine the interaction data 245 by obtaining user interaction data identifying interactions between user-controlled agent and computer-operated agents. In this respect, the interaction data 245 may include measurements indicating a number of interactions initiated by a user-controlled agent with respect to one or more computer-operated agents, or a number of interactions initiated by a computer-operated agent with respect to one or more user-controlled agent. The interaction data 245 may indicate the number of interactions that a particular user via a corresponding user-controlled agent has with one or more computer-operated agents, the length of time that a particular user-controlled agent is joined in a multiuser session, and the number of multiuser sessions that a particular user-controlled agent joins over a predefined period of time. The processor 236 may keep track of the user interactions with a number of computer-operated agents over a given time period.

The memory 232 also includes an interactive agent log 246. The interactive agent log 246 includes a listing of computer-operated agents that are available for instantiation to a multiuser session. The number of computer-operated agents listed in the interactive agent log 246 may correspond to the number of behavioral models that are kept in circulation. In this respect, if a behavioral model is purged, then the corresponding computer-operated agent is purged from the interactive agent log 246, and vice-versa. The interactive agent log 246 may be updated on a periodic basis in some embodiments, or on a non-periodic basis in other embodiments. The interactive agent log 246 may be updated with additional computer-operated agents being added to the pool of computer-operated agents or updated with the removal of least-popular computer-operated agents from the interactive agent log 246.

The device 110 includes a processor 212, the communications module 218, and the memory 220 that includes the application 222. The application 222 may be a simulation engine, or physically coded instructions that execute a simulation of a sporting event, such as a sports-themed video game. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in the memory 220, or a combination of both. The processor 212 of the device 110 executes instructions from the application 222 causing the processor 212 to run the sports-themed video game and provide access to an online transaction repository, where content items such as digital trading cards associated with the sports-themed video game can be purchased, sold, auctioned or exchanged with other participants in the sports-themed video game through the server 130.

In one or more implementations, using the driver engine 243, the processor 236 measures a number of interactions between a user-controlled agent and a computer-operated agent, where the number of interactions is measured for each computer-operated agent of a collection of computer-operated agents in a multiuser session of the interactive environment. In this respect, the computer-operated agents that are not inducing enough user interaction are gradually purged from the computer-operated agent population. On the other hand, the computer-operated agents that are inducing the number of interactions that exceed the threshold interaction rate are then reintroduced into a pool of behavioral models that are available for execution within a multiuser session of the interactive environment. In some implementations, the decision to keep or remove a computer-operated agent from the multiuser session is probabilistic. For example, the probability of removing a computer-operated agent may depend on the scoring metric or other user engagement metrics. In some aspects, the interactive agent log 246 is adjusted (or updated) to include the new number of computer-operated agents kept in circulation or when the computer-operated agents are purged from the population. Over a predefined period of time, the pool of behavior models may include behavioral models that induce a number of interactions with user-controlled agents that exceed the threshold interaction rate, thereby yielding a population of computer-operated agents that are maximizing user engagement in the interactive environment.

Once the computer-operated agents are entered into the pool, the computer-operated agents that are not engaging (e.g., relatively low interaction rates with users) are purged from the pool. In this respect, the computer-operated agents purged from the pool are not instantiated in a subsequent cycle when the processor 236 fetches configuration files (e.g., the behavioral models 244). In one or more implementations, only the computer-operated agents that are engaging (e.g., interaction rates with users exceed a threshold interaction rate) or computer-operated agents that are automatically selected by a sub-flow are instantiated to a multiuser session. In one or more implementations, if a computer-operated agent provides an inconsistent behavioral response distribution over time, the instantiated computer-operated agent is removed from the multiuser session. In this respect, the processor 236 removes the computer-operated agent from the interactive agent log 246. In some aspects, the processor 236 removes the behavioral model that corresponds to the removed computer-operated agent from the behavioral models 244. The rate of computer-operated agents being purged from the interactive agent log 246 may depend on the amount of data telemetry (e.g., interaction data 245) that is received from the users via the user-controlled agents.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
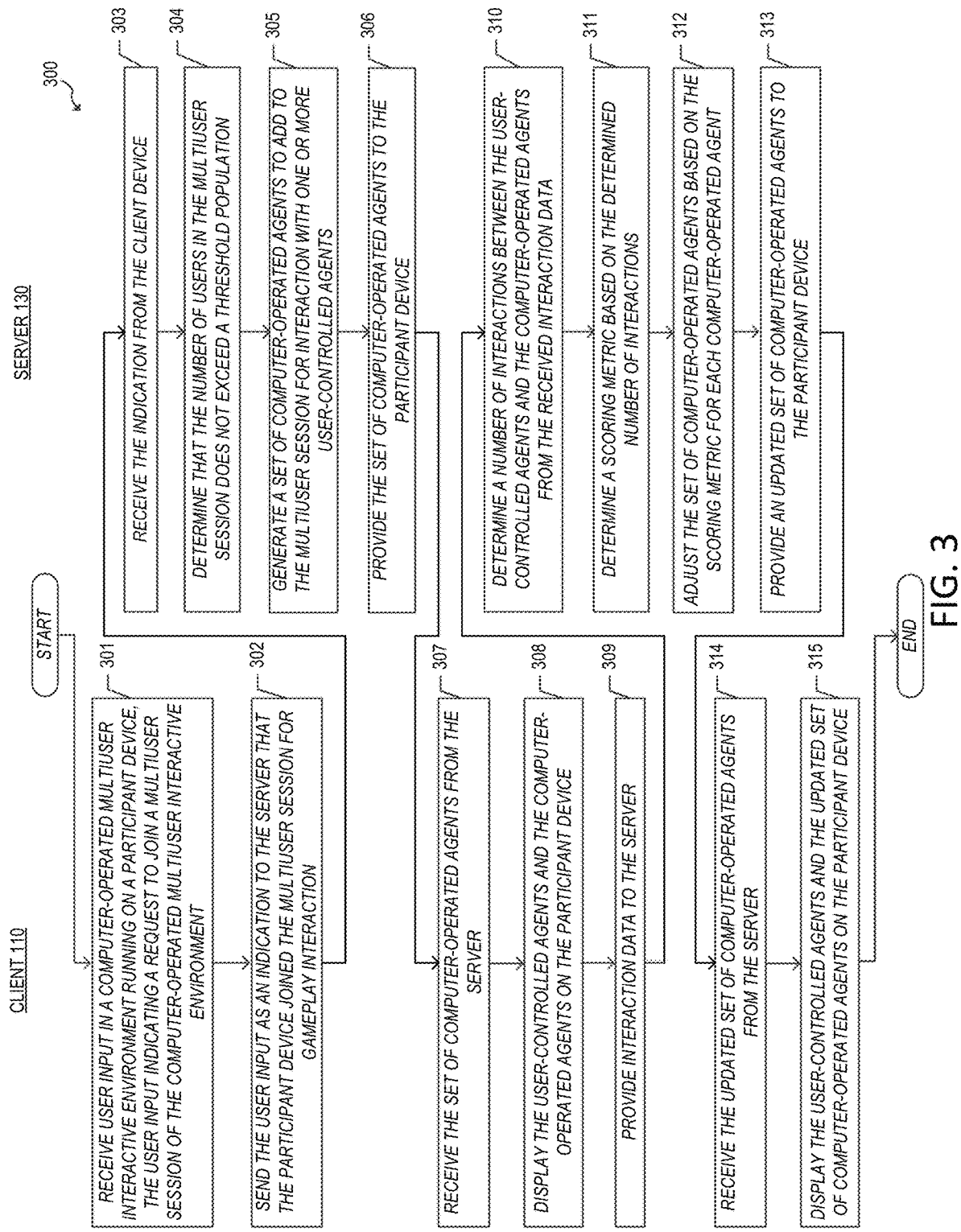
FIG. 3 illustrates an example process of facilitating user engagement rates through computer-operated agents in an interactive environment using the example client and server of FIG. 2.

FIG. 3 illustrates an example process 300 of facilitating user engagement rates through computer-operated agents in an interactive environment using the example client and server of FIG. 2. While FIG. 3 is described with reference to FIG. 2, it should be noted that the process steps of FIG. 3 may be performed by other systems. The process 300 begins in step 301 when a user, for example, loads an application 222 on a client 110 such as a computer-operated multiuser interactive environment running on the client 110, and the client 110 receives an input from the user in using the input device 216. In some implementations, the input indicates a request to join a multiuser session of the computer-operated multiuser interactive environment.

Next, in step 302, the application 222 on the client 110 sends the input as an indication to the server 130 that the client 110 has joined the multiuser session for gameplay interaction. In step 303, the server 130 receives the indication from the client 110. Subsequently, in step 304, the server 130 determines that the number of users in the multiuser session does not exceed a threshold population.

Next, in step 305, the server 130 generates a set of computer-operated agents to add to the multiuser session for interaction with one or more user-controlled agents. Subsequently, in step 306, the server 130 provides the set of computer-operated agents to the participant device.

Now turning back to the client 110, in step 307, the client 110 receives the set of computer-operated agents from the server 130. Next, in step 308, the client 110 provides the user-controlled agents and the computer-operated agents for display via the application 222 of the client 110. Subsequently, in step 309, the client 110 provides interaction data to the server 130.

Turning back to the server 130, in step 310, the server 130 determines a number of interactions between the user-controlled agents and the computer-operated agents from the received interaction data. Next, in step 311, the server 130 determines a scoring metric based on the determined number of interactions. Subsequently, in step 312, the server 130 adjusts the set of computer-operated agents based on the scoring metric for each computer-operated agent. In step 313, the server 130 provides an updated set of computer-operated agents to the client 110.

In step 314, the client receives the updated set of computer-operated agents from the server 130. Subsequently, in step 315, the client 110 displays the user-controlled agents and the updated set of computer-operated agents via the application 222 of the client 110.

The behavioral models 244 can be executed on the client 110 in some embodiments, or can be executed on the server 130 via the driver engine 243 in other embodiments. In a case where the client 110 is configured to execute the behavioral models 244, the processor 236 of the server 130 provides for transmission the behavioral models 244 to the client 110 during an offline operation. For example, the processor 236 using the driver engine 243 determines which one of the configurations is to be transmitted to the client 110 (or pushed to the client 110) based on the feedback (e.g., the interaction data 245) received with respect to interactions between the user-controlled agents and a particular computer-operated agent. In one or more implementations, the client 110 has a pull mechanism to pull the behavioral models 244 and the interactive agent log 246 from the server 130. In other aspects, the server 130 may push the same data as that of the pull mechanism in a push mechanism.

In one or more implementations, the server 130 fetches the configuration settings from a remote repository at the start of the multiuser session instantiation when the server 130 is configured to execute and run the behavioral models 244 via the drive engine 243. In other implementations, the processor 212 of the client 110 fetches the configuration settings from behavioral models 244 in the server 130. In some aspects, the processor 236 runs a machine learning algorithm that optimizes the computer-operated agent selection process based on one or more factors including, but not limited to, a factor indicating the percentage of the computer-operated agents that should be instantiated into a session, a factor indicating the configuration of the computer-operated agents that are being instantiated, a factor indicating the rules that apply to the instantiation of the computer-operated agents, and a factor indicating the number of computer-operated agents that are in a queue ready to be instantiated at a predetermined time.

In one or more implementations, the processor 212 of the client 110 pulls new data from the server 130 to instantiate new or updated computer-operated agents based on a schedule (e.g., every X number of time units) or when the client 110 detects that an existing multiuser session requires additional participants to increase the engagement rates among the existing participants joined in the session. In some aspects, the server 130 may push the new data to the client 110.

Figure 4:
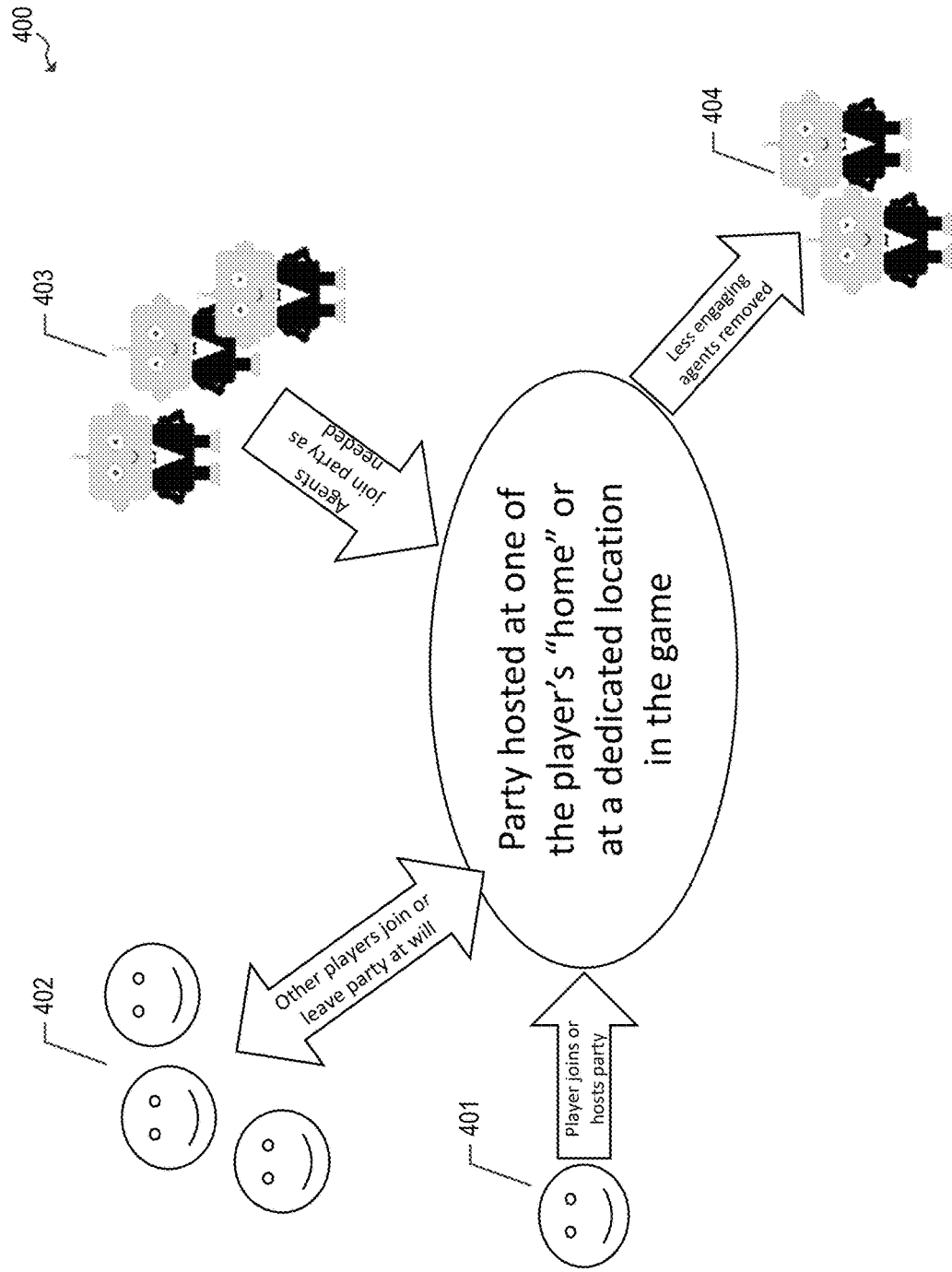
FIG. 4 illustrates a schematic diagram for practicing the example process of FIG. 3.

FIG. 4 illustrates a schematic diagram 400 for practicing the example process of FIG. 3. In FIG. 4, a player joins or hosts a multiuser session (e.g., 401) of an interactive environment. The multiuser session depicted as a party may be hosted at one of the player's virtual homes or is set at a dedicated virtual location in the interactive environment. Other players (or users) of the interactive environment join the multiuser session or decide to terminate their connection to the multiuser session such as leave party at will (e.g., 402). In many instances, the start of a party (or multiuser session) may not be sufficiently populated to maximize (or optimize) user engagement rates. In this respect, computer-operated agents can join the multiuser session as needed (e.g., 403), and are transparent to the player (or players). For example, a player may not recognize or realize that a character that the player is interacting with is in fact a computer-operated (or non-player controlled) agent. The computer-operated agents that are measured to be less engaging (i.e., relatively low interaction rates) are removed from the multiuser session (e.g., 404).

The computer-operated agents that are introduced into the interactive environment are an extension to the interactive environment and are configured to interact with user-controlled agents. During these interactions, the processor 236 is collecting engagement metrics that indicate different interaction rates at different times by the computer-operated agents. An update to an existing behavioral response distribution for a given computer-operated agent or the introduction of new computer-operated agents do not occur until a subsequent cycle commences, where the update and introduction of new agents is based on prior user interactions.

In some aspects, the number of popular computer-operated agents (with relatively high interaction rates) can be kept in circulation while some less popular computer-operated agents (with relatively smaller interaction rates) can be kept in circulation for diversity. In other aspects, the size of the population of computer-operated agents that are kept to be reintroduced into sessions of interactive environments is based on the interaction rates of the general user population. In the disclosed system, for each instance that a user-controlled agent interacts with a computer-operated agent, a log of behavior data from that interaction can be monitored and collected to generate and/or adjust behavior models that provide the behavioral response distribution for a given computer-operated agent.

In one or more implementations, in an instance where one or more computer-operated agents within a multiuser session are identified as potential agents to be replaced (or purged) based on the interaction data 245 indicating that the computer-operated agents yield relatively low interaction rates (e.g., below a threshold interaction rate), a number of replacement computer-operated agents listed in the interactive agent log 246 can be executed to run within the multiuser session using the behavioral models 244 as potential replacements. In some aspects, the replacement computer-operated agents can be executed to run for a predefined period of time to obtain sufficient interaction data from interactions with other user-controlled agents within the multiuser session. In this respect, the replacement computer-operated agents that are measured to be popular agents are maintained in the computer-operated agent population until a next iteration, and the replacement computer-operated agents that are measured to be the least popular (or non-engaging with users) are purged from the computer-operated agent population. In this respect, the behavior model that corresponds to a given computer-operated agent may be purged from the memory 232.

The disclosed system may be applicable to different types of multiplayer interactive environments, where multiuser sessions are established to promote interactions among users. For example, in a multiplayer shooter game, a session may be initiated where 2 teams of 32 players are needed to complete the game. In this example, there may be instances where 64 users may not join the game but rather a smaller number of users join the game, thereby causing a shortage of users to complete the game at the original configuration (e.g., 2 teams of 32 players). In this respect, the disclosed system introduces computer-operated agents to either team that requires additional players to help start the game. The computer-operated agents may follow a behavioral model that corresponds to actions that a user would initiate during gameplay. For example, a game may have an objective where cooperation between users and computer-operated agents is required, such as the computer-operated agents being configured to help capture a flag as part of the game's objective.

Figure 5:
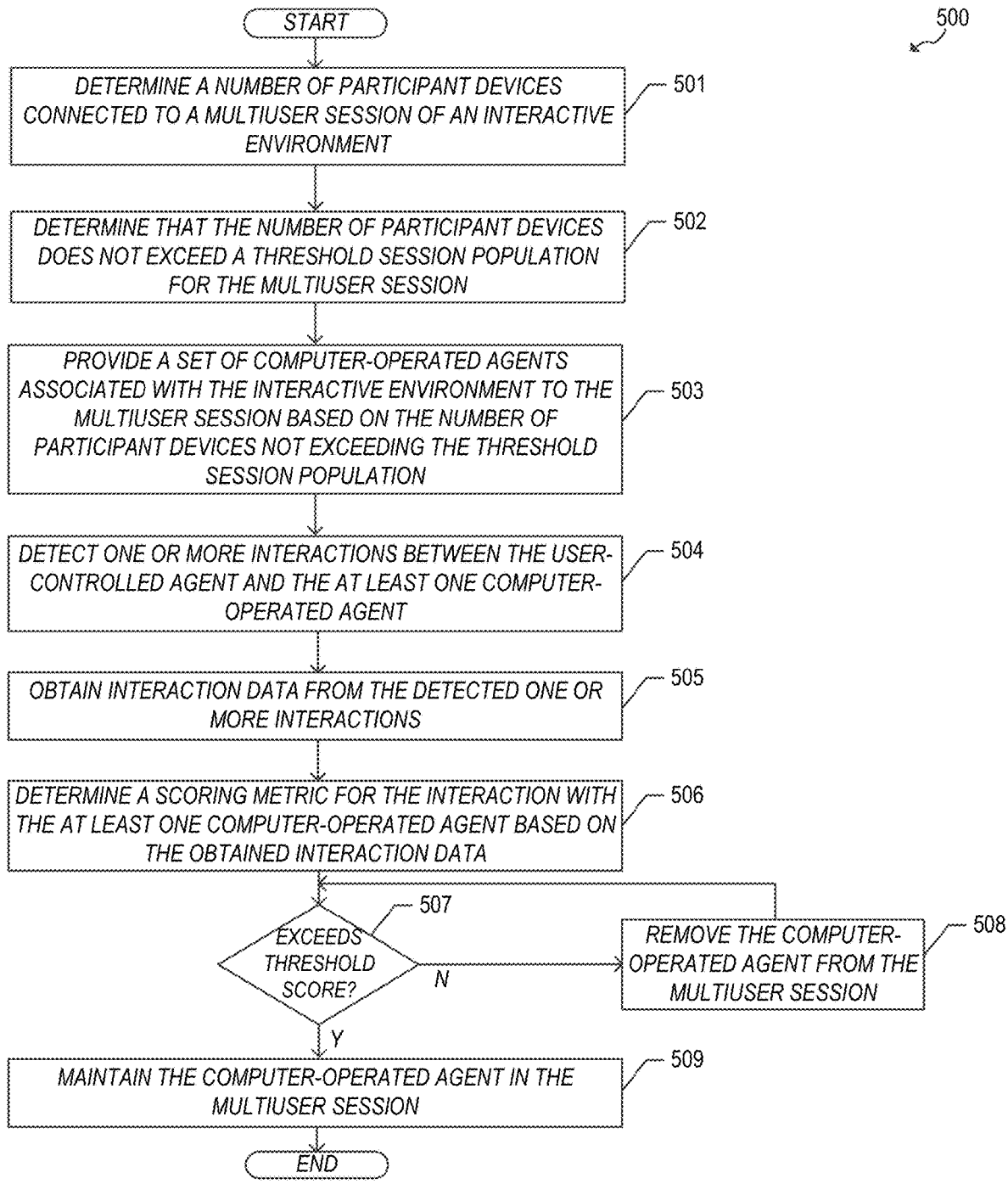
FIG. 5 illustrates an example process of facilitating user engagement rates through computer-operated agents in an interactive environment using the example server of FIG. 2.

FIG. 5 illustrates an example process 500 of facilitating user engagement rates through computer-operated agents in an interactive environment using the example server of FIG. 2. While FIG. 5 is described with reference to FIG. 2, it should be noted that the process steps of FIG. 5 may be performed by other systems. The process 500 begins by proceeding from start step to step 501 where the processor 236, using the driver engine 243, determines a number of participant devices connected to a multiuser session of an interactive environment.

Next, in step 502, the processor 236 determines that the number of participant devices does not exceed a threshold session population for the multiuser session. Subsequently, in step 503, the processor 236 provides a set of computer-operated agents associated with the interactive environment to the multiuser session based on the number of participant devices not exceeding the threshold session population.

Next, in step 504, using the driver engine 243, the processor 236 detects one or more interactions between the user-controlled agent and the at least one computer-operated agent. Subsequently, in step 505, the processor 236 obtains interaction data from the detected one or more interactions. Next, in step 506, the processor 236 determines a scoring metric for the interaction with the at least one computer-operated agent based on the obtained interaction data.

Subsequently, in step 507, the processor 236 determines whether the scoring metric exceeds a threshold score. If the scoring metric exceeds the threshold score, then the process 500 proceeds to step 509. Otherwise, the process 500 proceeds to step 508. In step 508, the processor 236 removes the computer-operated agent from the multiuser session when it is determined that the scoring metric does not exceed the threshold score. Next, in step 509, the processor 236 maintains the computer-operated agent in the multiuser session when it is determined that the scoring metric exceeds the threshold score.

Figure 6:
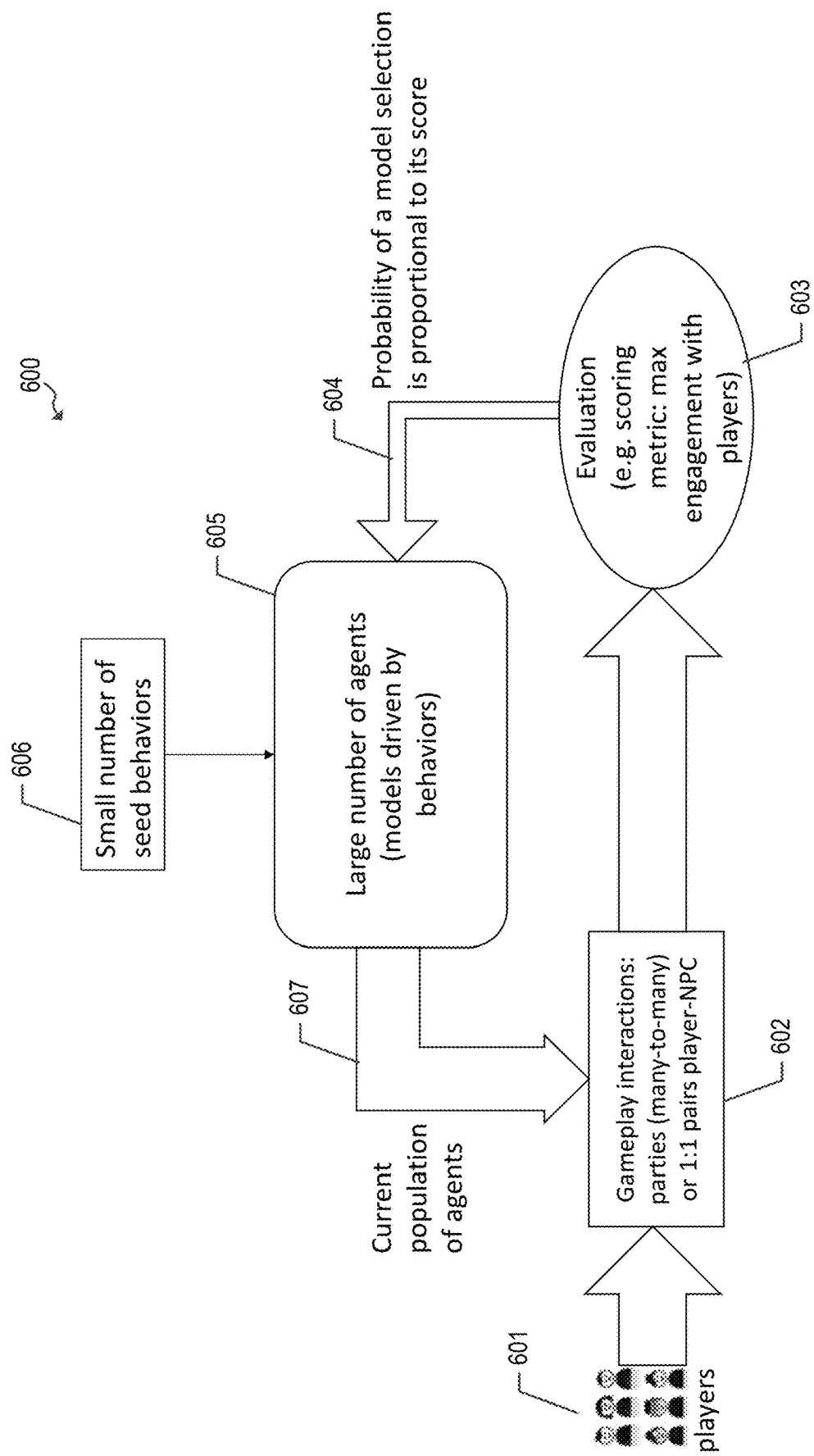
FIG. 6 illustrates a schematic diagram for practicing the example process of FIG. 5.

FIG. 6 illustrates a schematic diagram 600 for practicing the example process of FIG. 5. In FIG. 6, players 601 join a multiuser session of an interactive environment such as a life simulation video game, where gameplay interactions between multiple parties and/or individual pairings of player and non-player controlled agents (e.g., 602). An evaluation sub-flow where a scoring metric that indicates the maximum engagement rate with players can be determined (e.g., 603). The scoring metric may be based on the amount of interaction a user received from a computer-operated agent. As the engagement rates increase, the scoring metric increases. Based on the scoring metric, the probability of a behavioral model being selected is proportional to the scoring metric for that behavioral model (e.g., 604). At formation of the pool of computer-operated agents, a relatively large number of computer-operated agents, which are models driven by respective behavior distributions, are generated. The computer-operated agents are generated using a relative small number of seed behaviors (e.g., 606). The seed behaviors may be sampled by monitoring user-to-user interactions over a given time period. The computer-operated agents that are generated are then added to a current population of computer-operated agents (e.g., 607). The computer-operated agents that are instantiated to the multiuser session are fed from the current population of computer-operated agents.

In one or more implementations, using the driver engine 243, the processor 236 receives input indicating behavioral responses to actions by a computer-operated agent, where the actions correspond to a behavioral model. For example, while players are engaged with other players in a life simulation interactive environment (e.g., THE SIMS), telemetry data can be collected via the driver engine 243 to obtain information on how a user via the user-controlled agent is responding to a specific action in a specific context. In this respect, behavioral data that corresponds to an action by a computer-operated agent in response to an action by a virtual player (e.g., user-controlled agent), or vice versa, can be initially collected to generate a library of behaviors for a specific context or set of contexts. This library of behaviors can drive the generation of the behavioral models 244 that are utilized to run a sequence of actions that induce a response from a user via the user-controlled agent. In this respect, user input indicating certain user selections (or decisions made by users) during gameplay can be recorded to extrapolate different behavioral data depending on the context. The processor 236 can generate a relatively large number of behavioral models from the behavioral data for varying contexts. In each of the behavioral models 244, there is a sequence of actions and/or behavioral responses that are executed in response to a given trigger event, where the trigger event is an action initiated by a user-controlled agent. Each of the behavioral models 244 may include actions that correspond to one given context in some embodiments, or may include actions that correspond to multiple contexts in other embodiments.

In one or more implementations, using the driver engine 243, the processor 236 determines a set of engagement metrics from the multiuser session of the interactive environment, where the set of engagement metrics include the number of interactions between a user-controlled agent and a computer-operated agent and the number of computer-operated agents being monitored. In one or more aspects, as additional information about human interactions in response to an action in a given context can be collected (or monitored) from an active multiuser session of the interactive environment, the greater the number of behavioral models that can be generated and added to the pool of behavioral models.

In one or more implementations, using the driver engine 243, the processor 236 receives one or more streams of user interaction data (e.g., the interaction data 245), where each of the one or more streams of user interaction data is associated with a particular context. In this respect, the processor 236 generates a set of behavioral models from the received streams of user interaction data. In some aspects, the processor 236 generates a different set of behavioral models for each type of user behavior, where each set of behavioral models includes a number of models that correspond to different sequences of actions responsive to the type of user behavior. The user interaction data may include information about how often a user-controlled agent interacts with a computer-operated agent, information about which actions cause interaction rates that exceed a threshold interaction rate and which actions cause interactions rates that do not exceed the threshold interaction rate. The context may be a setting for an event in the multiuser session, for a type of relationship with a given user-controlled agent, for a prior interaction with a given user-controlled agent, or for other related circumstances with respect to a given behavioral model.

In one or more implementations, each of the behavior models 244 includes instructions that, when executed by the processor 236 using the driver engine 243, causes execution of an action or a sequence of actions by a computer-operated agent. In this respect, the behavioral model drives the operation of a corresponding computer-operated agent. The behavioral model may be initiated to drive the computer-operated agent in response to a trigger event. The trigger event may be the start of a multiuser session where a character depicted by the computer-operated agent is tasked to initiate interactions with other users in the multiuser session. The trigger event also may be an action initiated by a user-controlled agent that communicates a message intended for the computer-operated agent. The trigger event also may be a time during the multiuser session when the number of interactions with a specific user-controlled agent and/or an average number of interactions being detected in the multiuser session are determined to be below the threshold interaction rate. In some aspects, the threshold interaction rate may be a predetermined threshold that corresponds to a percentage of a maximum engagement rate with users of the interactive environment.

In one or more implementations, using the driver engine 243, the processor 236 loads a configuration for a given character being added to a multiuser session based on an identifier of the given character. In this respect, the behavioral model that represents the configuration is loaded to run one or more actions that correspond to a context associated with the given character. In some aspects, the configuration is loaded in an advanced sub-processor an offline subprocess before the start of each new session of the interactive environment.

As used herein, the term "iteration" refers to the need to collect a certain amount of data to determine whether each one of the configurations (e.g., behavioral models) that is driving a computer-operated agent satisfies the threshold interaction rates. In some implementations, the iteration is dictated by the amount of interaction data collected. In this respect, the processor 236 along with the driver engine 243 can process that collected engagement metrics to determine the popularity of each individual configuration model. Once there is enough telemetry data and behavioral data, the processor 236, through the driver engine 243, drives the behavioral model to then determine popularity of each computer-operated agent. In one or more implementations, the processor 236 can fetch new configurations (or new behavioral models) when the pool of behavioral models (e.g., the behavioral models 244) is updated.

In one or more implementations, the processor 236 generates new configuration files (or new behavioral models) to represent the evolution of the computer-operated agents. In some aspects, the new behavioral models are generated based on new sample behavioral data (or interaction data) being obtained, which are then added to the pool of behavioral models (or as part of the behavioral models 244).

There may be a limit to the number of computer-operated agents that can be instantiated into a multiuser session of the interactive environment (e.g., number than can attend a party created by a virtual player of the multiplayer life simulation game). For example, as the number user-controlled agents join the multiuser session, the number of computer-operated agents instantiated into the multiuser session is decreased proportionately. In one or more implementations, the sum of the number of user-controlled agents and the number of computer-operated agents that can coexist in a multiuser session is bounded by a maximum agent population (or a predetermined agent population threshold). In one or more implementations, the sum of the number of user-controlled agents and the number of computer-operated agents is below the maximum agent population and maintained proximate to an optimum agent population where the user engagement metric is proximate to a maximum interaction rate for users. For example, if the agent population in a multiuser session is initially composed of about 10% computer-operated agents then adjusted upward to about a composition of 20% computer-operated agents, and the user engagement metrics indicate that the multiuser session interactions are more engaging at the 10% composition as opposed to the 20% composition, then the processor 236, using the driver engine 243, can revert the parameters back to a composition of 10% computer-operated agents to yield the optimal interaction rates with users. In this respect, maintaining the agent population approximately at an optimum agent population for the multiuser session provides for maintaining users via the user-controlled agents engaged in the interactive environment. The parameters for setting the size of the computer-operated agent population can be set using global parameters in some embodiments, or using local parameters in other embodiments. The user may not have access to global parameters (or local parameters) to alter any settings of the computer-operated agents during game play or during an offline game state.

In one or more implementations, a computer-operated agent is mapped to one configuration file (or behavioral model). In other aspects, a computer-operated agent may be mapped to more than one configuration file, where a configuration file can be selected based on a given context. The configuration file is a black-box, where the resulting behavior is directly based on the input of how certain parameters are being selected. In some aspects, the same configuration file may be applied to multiple computer-operated agents, where each computer-operated agent may have different inputs causing different behavioral executions during gameplay.

Figure 7:
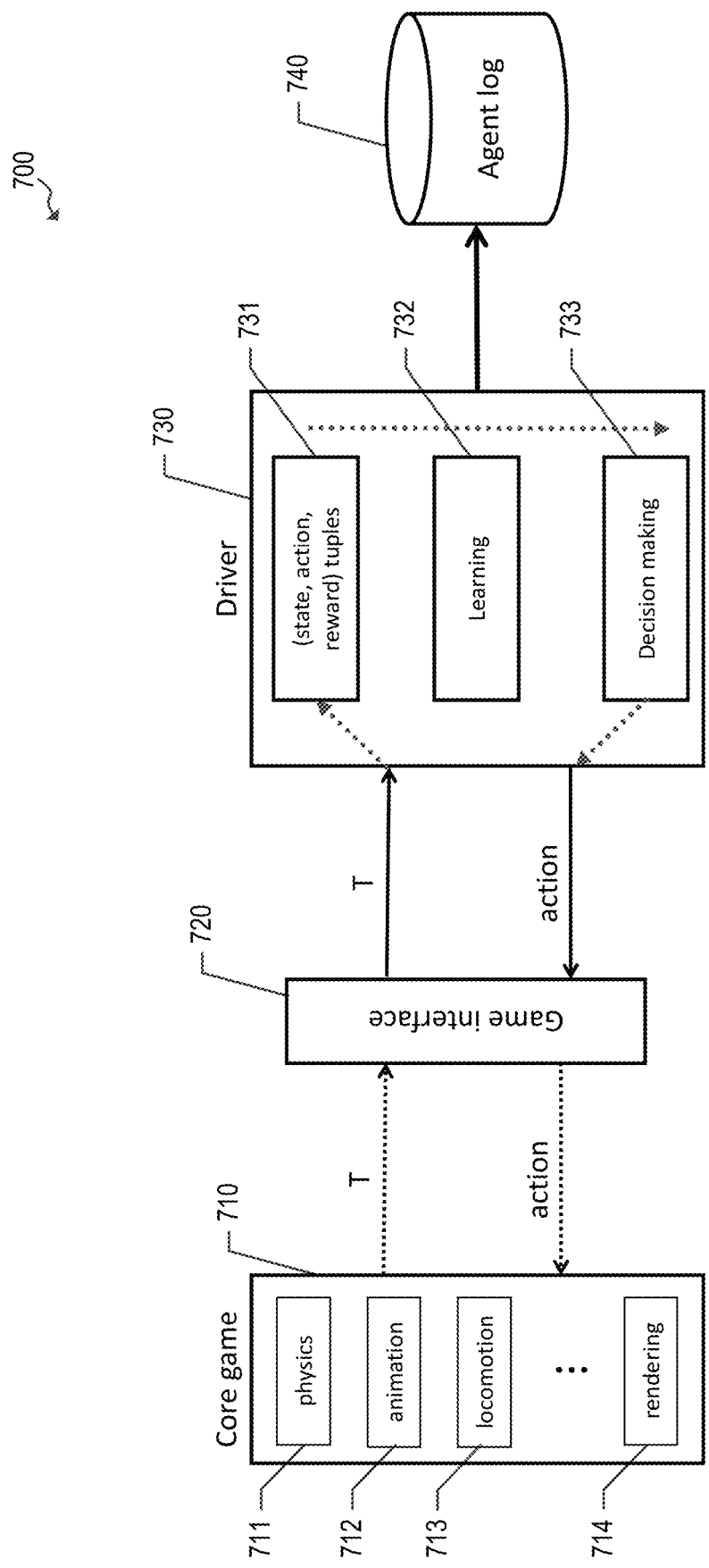
FIG. 7 illustrates a schematic diagram of an example interface between a driver and a computer-operated agent using the example server of FIG. 2.

FIG. 7 illustrates a schematic diagram 700 of an example interface between a driver and a computer-operated agent using the example server of FIG. 2. In FIG. 7, the schematic diagram 700 illustrates a driver 730 (e.g., the driver engine 243), a game interface 720 (e.g., interactive environment interface 242), an agent log 740 (e.g., the interactive agent log 246), and a core game 710 (e.g., the interactive environment engine 240). The driver 730 includes a tuples data engine 731, a behavioral model engine 732, and a decision-making engine 733. The core game 710 includes a physical engine 711, an animation engine 712, a locomotion engine 713, and a rendering engine 714. The driver is communicably coupled to the core game via the game interface 720. The game interface 720 is configured to receive a pairing of state information and reward information from the core game 710, and receives action information from the driver 730.

In one or more implementations, the driver engine 243 is remote to the client 110, and accessible to the client 110 over a network. The driver engine 243 may be part of the server 130 in some embodiments, or remotely accessible to the server 130 while maintaining a remote connection to the client 110 in other embodiments. The driver engine 243 can communicate data that indicates a decision as to which action to take based on a given context and/or rules that apply to a particular behavioral model. In one or more implementations, the driver engine 243 is configured to accept a tuple of data as input, which consists of a state value, an action value and a reward value. The driver engine 243 can run one of the behavioral models 244 and output a decision value for the behavioral model based on the received tuple of data. The output from the driver engine 243 carrying the decision value can be fed back to the interactive environment engine 240 via the interactive environment interface 242 to render an animation sequence that represents an action by the computer-operated agent. The driver engine 243 also provides an output to the interactive agent log 246, such as updates to the behavioral model and/or state information about the computer-operated agent (e.g., whether the computer-operated agent is being kept in circulation or scheduled to be purged from the population).

Figure 8:
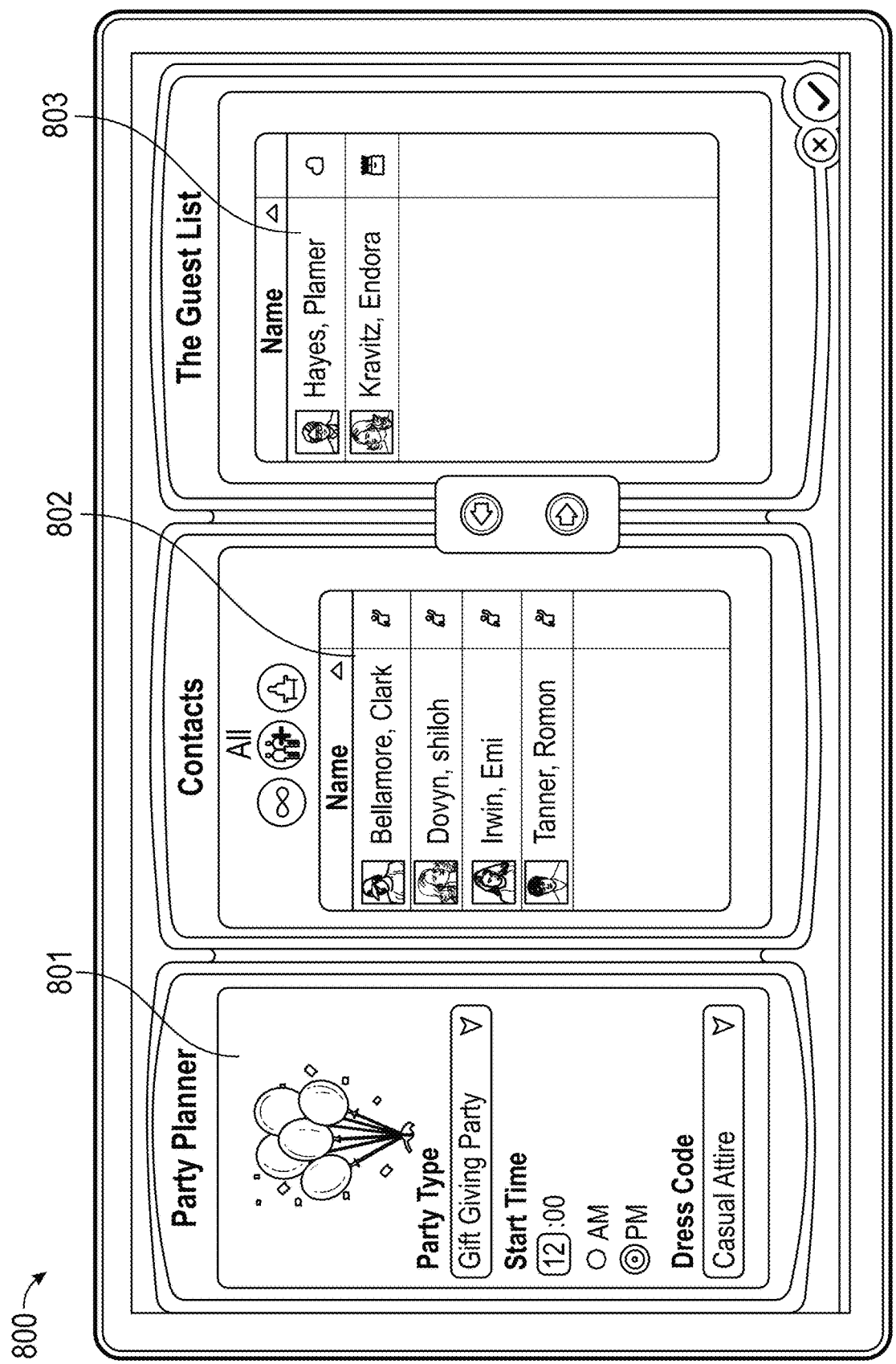
FIG. 8 illustrates an example of a user interface for practicing the example process of FIG. 3.

FIG. 8 illustrates an example of a user interface 800 for practicing the example process of FIG. 3. The user interface 800 depicts a landing page where a user (or game player) can set up a multiuser session. The user interface 800 includes user-selectable parameters 801 for the multiuser session, such as the type of session (e.g., gift giving party), the start time and the dress code for participants of the session (e.g., virtual players that join the gift giving party). The user interface 800 also includes a listing of contacts 802 composed of user-controlled agents that the user can select from, and also includes a guest list 803 that indicates user-controlled agents (as characters) that have been invited to join the session. In some aspects, the listing of contacts 802 and/or the guest list 803 include one or more computer-operated agents added to the different listings of user-controlled characters.

In one or more implementations, when a multiuser session is being initiated (e.g., a user is creating a party to host), the processor 236 obtains sample user data that indicates user-selected appearance data, body shape data, gender data and other physical feature data for a given virtual character. The processor 236 can extrapolate the sample user data to generate additional appearance metadata for computer-operated agents depending on a given context of a multiuser session. In some aspects, the user interface 800 includes controls to adjust and/or supplement the appearance metadata.

In one or more implementations, traits may be associated with a computer-operated agent, where the traits depict specific characters. In this respect, each of the behavioral models 244 may include a different set of traits. For example, if a computer-operated agent is in a friendly relationship with another agent (user-controlled or computer-operated), the associated traits of the computer-operated agent are likely to cause a friendly behavior response to the other agent (e.g., tell a friendly story or a joke), whereas an unfriendly relationship with another agent would indicate that the associated traits are likely to cause an unfriendly behavior response by the computer-operated agent toward the other agent. In some aspects, the user interface 800 includes controls to adjust and/or supplement the trait information in a given behavioral model.

Figure 9:
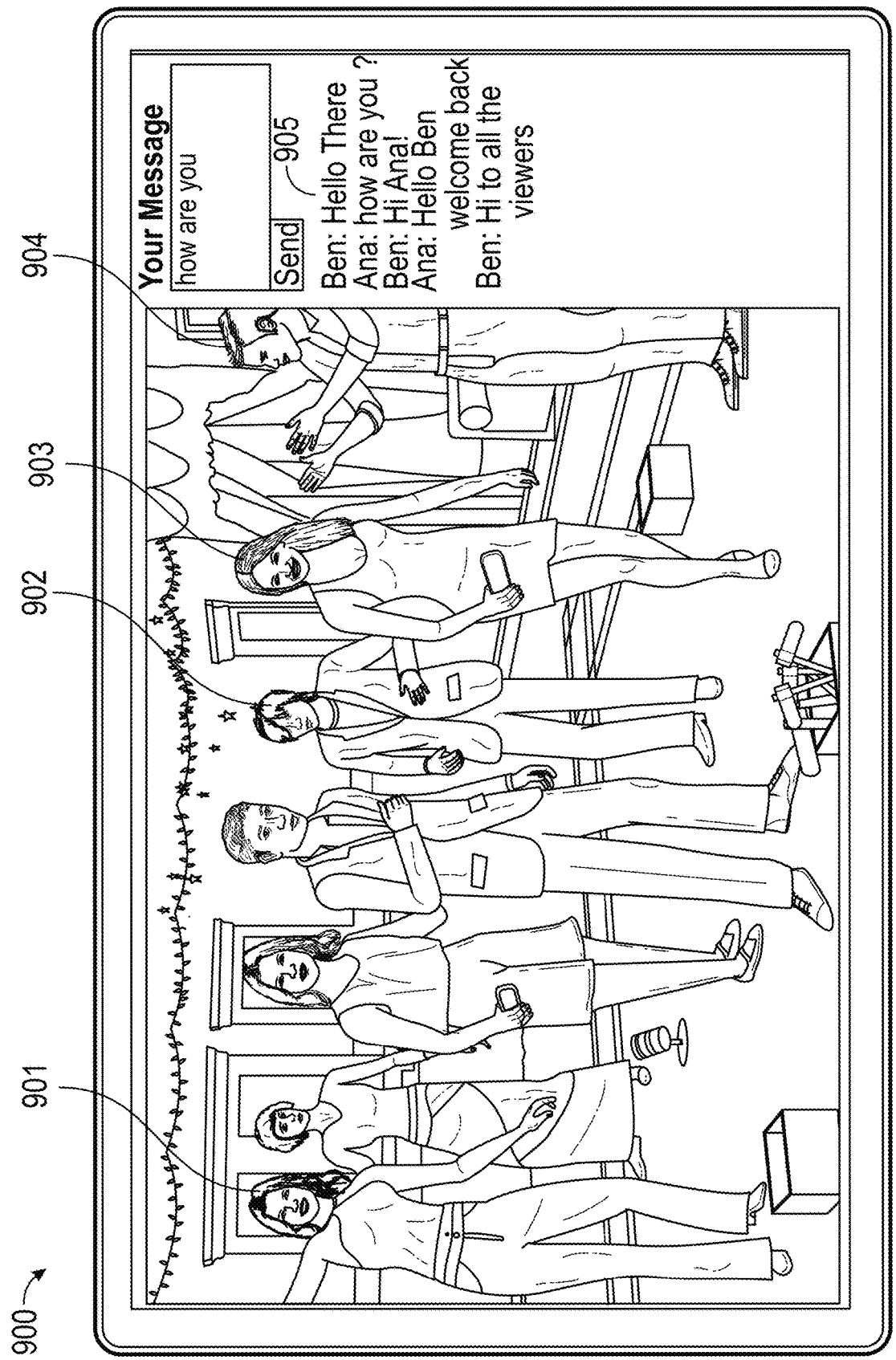
FIG. 9 illustrates an example of a user interface for practicing the example process of FIG. 5.

FIG. 9 illustrates an example of a user interface 900 for practicing the example process of FIG. 5. The user interface 900 includes a screen capture of computer-operated agents interacting with users via the user-controlled agents during gameplay. The screen capture illustrates a scene where the computer-operated agents are performing behaviors that cause them to interact with the users. The screen capture includes an animated representation of a computer-operated agent 901, an animated representation of a user-controlled agent 902 associated with a user invited to join and participate in the multiuser session, an animated representation of a user-controlled agent 903 associated with the user that created the multiuser session, and an animated representation of a computer-operated agent 904 configured to interact with the user-controlled agent 902 and/or the user-controlled agent 903. The user interface 900 also includes a messaging interface 905, where a user participating in the multiuser session can write and send a message to another user and/or to a character that is one of the computer-operated agents (e.g., 901, 904). The messaging interface 905 provides for display the outgoing and incoming messages between the user and the recipient agent. In a case where a computer-operated agent is the targeted recipient of messages from the user via the messaging interface 905, the computer-operated agent may generate a response to each message from the user based on a behavioral response distribution from the behavioral model that corresponds to the computer-operated agent.

In one or more implementations, a user-controlled agent depicted as a first character (e.g., 903) can be associated with a computer-operated agent depicted as a second character (e.g., 904), such that the first character enters into a virtual relationship with the second character. A copy of the computer-operated agent can be added to a user profile or to a virtual place profile (e.g., the virtual household of the user-controlled agent that is in a relationship with the particular computer-operated agent). There can be a relationship established between a character and a computer-operated agent even if the character is a non-player character (i.e., a computer-operated agent) in some embodiments or the character is controlled by other users in other embodiments. In some aspects, a user, which has dominion over both the computer-operated agent and the character in the household, can either take complete control over the character based on the association or keep the character interacting with the same computer-operated agent.

In one or more implementations, a user has complete control over the functionality of all the agents coexisting in a virtual household created by the user. In one or more implementations, a computer-operated agent has associated appearance metadata and associated behavior metadata. The behavior metadata provides the attributes for certain action outcomes to occur based on the behavior distribution of the corresponding behavioral model. The appearance metadata provides the attributes that describe whether the computer-operated agent is depicted as a male or female, different ages, different body shapes, different body color tones, and other physical features that provide different appearances for the computer-operated agents. In this respect, a user can define a particular appearance by adjusting the appearance metadata of the character that is in a relationship with a particular computer-operated agent. In some aspects, the behavioral response distribution of a given computer-operated agent may vary depending on the age data associated with the given computer-operated agent (e.g., a computer-operated agent depicting a child would execute a behavioral response distribution that corresponds to child behavior). The age data may include a specific age that corresponds to a specific behavior at the specific age in some embodiments, or a range of ages that corresponds to an average behavioral response suitable for the range of ages in other embodiments.

Hardware Overview

Figure 10:
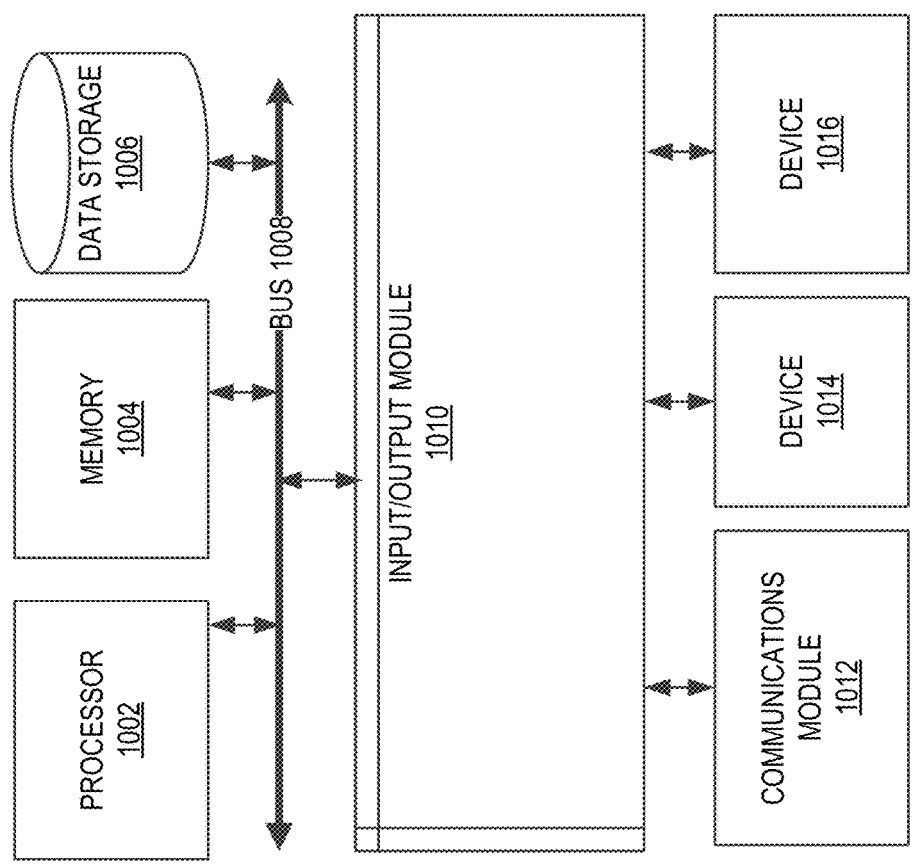
FIG. 10 is a block diagram illustrating an example computer system with which the client and server of FIG. 2 can be implemented.

FIG. 10 is a block diagram illustrating an exemplary computer system 1000 with which the client 110 and server 130 of FIG. 1 can be implemented. In certain aspects, the computer system 1000 may be implemented using hardware or a combination of software and hardware, either in a dedicated server, integrated into another entity, or distributed across multiple entities.

Computer system 1000 (e.g., client 110 and server 130) includes a bus 1008 or other communication mechanism for communicating information, and a processor 1002 (e.g., processor 212 and 236) coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer readable medium for execution by, or to control the operation of, the computer system 1000, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to bus 1008 for storing information and instructions. Computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 (e.g., communications modules 218 and 238) include networking interface cards, such as Ethernet cards and modems. In certain aspects, the input/output module 1010 is configured to connect to a plurality of devices, such as an input device 1014 (e.g., input device 216) and/or an output device 1016 (e.g., output device 214). Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as a LCD (liquid crystal display) monitor, for displaying information to the user.

According to one aspect of the present disclosure, the client 110 and server 130 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   determining a number of participant devices connected to a multiuser session of an interactive environment, the multiuser session including a user-controlled agent associated with a participant device that initiated the multiuser session for interaction with other user-controlled agents that join the multiuser session;
   determining that the number of participant devices does not exceed a threshold session population for the multiuser session;
   providing a set of computer-operated agents associated with the interactive environment to the multiuser session based on the number of participant devices not exceeding the threshold session population, at least one computer-operated agent in the set of computer-operated agents being configured to interact with the user-controlled agent in the multiuser session, each of the at least one computer-operated agents associated with a corresponding behavior metadata, wherein the behavior metadata includes a behavioral response distribution that defines a decision making process for interactions between the at least one computer-operated agent and the user-controlled agents, and the behavioral response distribution for a given computer-operated agent is periodically updated responsive to interactions of the given at least one computer-operated agent; and
   maintaining at least one of the computer-operated agents in association with the corresponding behavior metadata independently of the multiuser session for use in subsequent different multiuser sessions of the interactive environment based on interactions of the computer-operated agents with the user-controlled agents.

2. The computer-implemented method of claim 1, further comprising:
   generating behavioral models from obtained interaction data, wherein each of the behavioral models includes a random distribution of behavioral response actions for the computer-operated agent.

3. The computer-implemented method of claim 2, wherein each of the behavioral models includes a behavior tree that drives selections of actions for the computer-operated agent, wherein the behavior tree is a binary decision tree that includes a parent node that represents a trigger event and a child node that represents a respective outcome from the trigger event.

4. The computer-implemented method of claim 2, wherein the behavioral models represent respective configurations that utilize different input parameters, further comprising:
   translating input parameters to a corresponding behavioral sequence for a computer-operated agent.

5. The computer-implemented method of claim 2, wherein obtaining interaction data comprises measuring a number of interactions between the user-controlled agent and the computer-operated agent, and wherein the number of interactions is measured for each computer-operated agent of a collection of computer-operated agents in the multiuser session.

6. The computer-implemented method of claim 5, wherein computer-operated agents that induce the number of interactions that exceed a threshold interaction rate are reintroduced into a pool of behavioral models that are available for execution within the multiuser session.

7. The computer-implemented method of claim 6, wherein computer-operated agents that do not induce the number of interactions that exceed the threshold interaction rate are purged from a computer-operated agent population, and wherein computer-operated agents purged from the computer-operated agent population are not instantiated in a subsequent cycle.

8. The computer-implemented method of claim 6, wherein the threshold interaction rate comprises at least a predetermined threshold that corresponds to a percentage of a maximum engagement rate with users of the interactive environment.

9. The computer-implemented method of claim 6, further comprising:
   fetching additional configurations that correspond to new behavioral models when the pool of behavioral models is updated.

10. The computer-implemented method of claim 1, further comprising:
    receiving input indicating behavioral responses from a user-controlled agent that is in response to actions by a computer-operated agent, wherein the actions correspond to a behavioral model.

11. The computer-implemented method of claim 1, further comprising:
    receiving one or more streams of user interaction data, wherein each of the one or more streams of user interaction data is associated with a particular context.

12. The computer-implemented method of claim 1, further comprising:
    generating a different set of behavioral models for each type of user behavior, wherein each set of behavioral models includes a number of models that correspond to different sequences of actions responsive to the type of user behavior.

13. The computer-implemented method of claim 1, further comprising:
    loading a configuration for a given character being added to the multiuser session based on an identifier of the given character.

14. The computer-implemented method of claim 1, wherein a sum of a number of user-controlled agents and a number of computer-operated agents that can coexist in the multiuser session is bounded by a maximum agent population.

15. The computer-implemented method of claim 1, wherein a sum of a number of user-controlled agents and a number of computer-operated agents is below a maximum agent population and the sum is proximate to an agent population where a user engagement metric is proximate to a maximum interaction rate for users of the multiuser session.

16. The computer-implemented method of claim 1, further comprising:
   receiving a tuple of data that includes a state value, an action value and a reward value;
   running one of a plurality of behavioral models; and
   outputting a decision value for the behavioral model based on a received tuple of data.

17. A system, comprising:
   a processor; and
   a memory comprising instructions stored thereon, which when executed by the processor, cause the processor to:
      determine whether a multiuser session of an interactive environment includes a number of participant devices that exceeds a threshold session population for the multiuser session, the multiuser session including a user-controlled agent associated with a participant device that initiated the multiuser session for interaction with other user-controlled agents that join the multiuser session;
      add a set of computer-operated agents associated with the interactive environment to the multiuser session when it is determined that the multiuser session does not include a number of participant devices that exceeds the threshold session population, each at least one computer-operated agent of the set of computer-operated agents associated with a corresponding behavior metadata, wherein the behavior metadata includes a behavioral response distribution that defines a decision making process for interactions between the at least one computer-operated agent and the user-controlled agents, and the behavioral response distribution for a given computer-operated agent is periodically updated responsive to interactions of the given at least one computer-operated agent; and
      maintain at least one of the computer-operated agents in association with the corresponding behavior metadata independently of the multiuser session for use in subsequent different multiuser sessions of the interactive environment based on interactions of the computer-operated agents with the user-controlled agents.

18. The system of claim 17, wherein computer-operated agents that have interaction rates with users that exceed a threshold interaction rate are reinstantiated to the multiuser session.

19. The system of claim 17, wherein the instructions further cause the processor to:
   determine a set of engagement metrics from the multiuser session of the interactive environment, wherein the set of engagement metrics include a number of interactions between a user-controlled agent and a computer-operated agent and a number of computer-operated agents being monitored.

20. A non-transitory computer readable storage medium including instructions that, when executed by a processor, cause the processor to perform a method, the method comprising:
   determining whether a multiuser session of an interactive environment includes a number of participant devices that exceeds a threshold session population for the multiuser session, the multiuser session including a user-controlled agent associated with a participant device that initiated the multiuser session for interaction with other user-controlled agents that join the multiuser session;
   adding a set of computer-operated agents associated with the interactive environment to the multiuser session when it is determined that the multiuser session does not include a number of participant devices that exceeds the threshold session population, each at least one computer-operated agents of the set of computer-operated agents associated with a corresponding behavior metadata, wherein the behavior metadata includes a behavioral response distribution that defines a decision making process for interactions between the at least one computer-operated agent and the user-controlled agents, and the behavioral response distribution for a given computer-operated agent is periodically updated responsive to interactions of the given at least one computer-operated agent; and
   maintaining at least one of the computer-operated agents in association with the corresponding behavior metadata independently of the multiuser session for use in subsequent different multiuser sessions of the interactive environment based on interactions of the computer-operated agents with the user-controlled agents.

* * * * *